United States Patent
Rao

(10) Patent No.: US 10,791,249 B2
(45) Date of Patent: Sep. 29, 2020

(54) COLOR GAMUT MAPPING METHOD AND COLOR GAMUT MAPPING APPARATUS

(71) Applicant: Shenzhen China Star Optoelectronics Semiconductor Display Technology Co., Ltd., Shenzhen, Guangdong (CN)

(72) Inventor: Yang Rao, Guangdong (CN)

(73) Assignee: SHENZHEN CHINA STAR OPTOELECTRONICS SEMICONDUCTOR DISPLAY TECHNOLOGY CO., LTD., Shenzhen (CN)

(*) Notice: Subject to any disclaimer, the term of this patent is extended or adjusted under 35 U.S.C. 154(b) by 44 days.

(21) Appl. No.: 15/741,043

(22) PCT Filed: Dec. 20, 2017

(86) PCT No.: PCT/CN2017/117359
§ 371 (c)(1),
(2) Date: Sep. 27, 2018

(87) PCT Pub. No.: WO2019/090914
PCT Pub. Date: May 16, 2019

(65) Prior Publication Data
US 2019/0387132 A1    Dec. 19, 2019

(51) Int. Cl.
*H04N 1/60* (2006.01)
*G06T 7/90* (2017.01)

(52) U.S. Cl.
CPC ............. *H04N 1/6066* (2013.01); *G06T 7/90* (2017.01)

(58) Field of Classification Search
CPC ...... H04N 1/6066; H04N 1/6061; H04N 9/64; H04N 5/202; G06T 7/90
(Continued)

(56) References Cited

U.S. PATENT DOCUMENTS

| 10,242,461 B1* | 3/2019 | Rao | H04N 1/6058 |
| 2008/0080767 A1* | 4/2008 | Cho | H04N 1/6027 382/167 |

(Continued)

FOREIGN PATENT DOCUMENTS

| CN | 101621700 A | 1/2010 |
| CN | 102209179 A | 10/2011 |

(Continued)

*Primary Examiner* — Jerome Grant, II
(74) *Attorney, Agent, or Firm* — Hemisphere Law, PLLC; Zhigang Ma

(57) ABSTRACT

A method of gamut mapping and color gamut mapping apparatus comprises: acquiring the Lab value of the color point in the original color gamut; and determining the color point in the original color gamut relative to the coordinate location in a hue plane based on the Lab value; and determining the mapping target gamut of the color point based on the coordinate location; If a color point is located outside the mapping target area, it determining the first intersection point of the line connecting the color point and the maximum brightness and the borderline of the mapping target color gamut and the second intersection point of the color point relative to the borderline of the mapping target gamut, and finally according to the preset adjustment parameter, the mapping point being determined on the borderline of the mapping target color gamut relative to the color point.

15 Claims, 4 Drawing Sheets

(58) Field of Classification Search
USPC .......................................................... 382/162
See application file for complete search history.

(56) References Cited

U.S. PATENT DOCUMENTS

| | | |
|---|---|---|
| 2008/0273794 A1 | 11/2008 | Samworth |
| 2009/0059326 A1* | 3/2009 | Hong .................... G06T 11/001 |
| | | 358/518 |
| 2016/0037019 A1 | 2/2016 | Xue et al. |
| 2016/0155245 A1* | 6/2016 | Stauder ................. G06T 11/001 |
| | | 382/167 |
| 2016/0189673 A1* | 6/2016 | Naccari .................. G09G 3/002 |
| | | 345/590 |
| 2017/0201653 A1* | 7/2017 | Kyan ....................... H04N 1/54 |
| 2017/0208218 A1* | 7/2017 | Morvan ................ H04N 1/6058 |
| 2018/0352263 A1* | 12/2018 | Francois ............... G09G 3/2003 |
| 2019/0268484 A1* | 8/2019 | Yamazaki ............ H04N 1/0097 |
| 2019/0385343 A1* | 12/2019 | Rao ....................... G06T 11/001 |

FOREIGN PATENT DOCUMENTS

| | | |
|---|---|---|
| CN | 104112081 A | 10/2014 |
| JP | 2008-271131 A | 11/2008 |
| JP | 2010-93477 A | 4/2010 |
| KR | 10-2005-0068595 A | 7/2005 |

\* cited by examiner

COLOR GAMUT MAPPING METHOD AND COLOR GAMUT MAPPING APPARATUS

RELATED APPLICATIONS

The present application is a National Phase of International Application Number PCT/CN2017/117359 filed Dec. 20, 2017, and claims the priority of China Application No. 201711088270.2, filed Nov. 7, 2017

FIELD OF THE DISCLOSURE

The present invention relates to the field of image processing, and in particular, to a color gamut mapping method and a color gamut mapping apparatus.

BACKGROUND

With the continuous development of science and technology, multi-media devices are gradually showing diversified trends. Different display devices have different color display modes. However, the gamut mapping and matching between display devices are also increasingly prominent.

Shown in FIG. 1, HPMINDE algorithm is commonly used at this stage for the problem of ultra-color gamut. The color out of the color gamut all cut to the target gamut borderline, and the color gamut directly output the original color. FIG. 2, the color point of the color gamut originally outputs, and accurate representation of the color in the color gamut are ensured. The point outside the color gamut mapping along the brightness axis. The color outside the color gamut area is sequentially mapped in the color gamut borderline of the color gamut area. The color gamut K maps into the T point on color gamut borderline based on the principle of the minimum color difference. The color point P outside of the color gamut maps into the point P based on the principle of the minimum color difference.

For the gamut mapping algorithm, especially in the process of mapping the large color gamut to the small color gamut, the common algorithm is used to map the color dots outside the small color gamut all along a point toward the brightness axis. A large difference between the area and the mapped line segment. It directly leads to the poor mapping uniformity. At the same time, the image mapping is concentrated in a small area and easy to level information, which easily causes the phenomenon of blur and halo noise.

SUMMARY

The technical problem to be solved by the present invention is to provide a color gamut mapping algorithm, which obtains the mapping point coordinates by area proportion, determines the mapping direction, and improves the uniformity and detail level of the color points mapped on the border.

In order to solve the above technical problem, the present invention provides a color gamut mapping method, comprising the following steps: determining a mapping target color gamut of an original color gamut in a same color gamut space; wherein an area of the mapping target color gamut is smaller than an area of the original color gamut; acquiring an RGB grayscale value of a color point in the original color gamut, and acquiring a lab value of a color point in an original color gamut according to the RGB grayscale value; using a Lab value of a color point in the original color gamut, a color point and a brightness axis in the original color gamut as a plane to acquire a chromaticity coordinate, a brightness coordinate and a hue angle of the color point in a hue plane corresponding to the original color gamut coordinates; and determining coordinate location where the color point in the hug plane corresponding to the original color gamut based on the chromaticity coordinate, the brightness coordinate and the hug angle in the hue plane; determining whether the color point is located outside the mapping target area according to the coordinate location; if the color point is located outside the mapping target area, determining a first intersection point of a connection line connecting the color point with a brightest midpoint and a borderline of the mapping target gamut area and the connection line, and a second interaction point of the color point relative to a borderline of the mapping target gamut area, wherein length of the second interaction point and the color point is the shortest distance between the color point and the borderline of the mapping target gamut; respectively acquiring the coordinate location of the first intersection point and the second intersection point; wherein the coordinate location comprises a brightness coordinate and a chromaticity coordinate; acquiring the chromaticity coordinate of the mapping point by adding an adjusting parameter and a chromaticity coordinate difference between the first intersection point and the second intersection point with a chromaticity coordinate of the second intersection point; acquiring the brightness coordinate of the mapping point by adding an adjusting parameter and a brightness coordinate difference between the first intersection point and the second intersection point adding with a brightness coordinate.

In order to solve the above technical problem, the present invention further provides a color gamut mapping method, comprising the following steps: determining a mapping target color gamut of an original color gamut in a same color gamut space; wherein an area of the mapping target color gamut is smaller than an area of the original color gamut; acquiring a Lab value of a color point of the original color gamut, and determining a coordinate location of the color point located in a hue plane relative to the original color gamut; determining whether the color point is located outside the mapping target gamut according to the coordinate position; if the color point is located outside the mapping target gamut, determining a first intersection point of a connection line connecting the color point with a brightest midpoint and a borderline of the mapping target gamut and the connection line, and a second interaction point of the color point relative to a borderline of the mapping target gamut, wherein length of the second interaction point and the color point is the short distance between the color point and the borderline; based on a preset adjustment parameter, a coordinate location of the first intersection, and a coordinate location of the second intersection point; determining a mapping point where the color point is on a borderline of the mapping target color gamut.

In order to solve the above technical problem, the present invention further provides a color gamut mapping apparatus, wherein the color gamut mapping apparatus comprises a controller and a data collector electrically connected to each other, the controller is configured to determine a mapping target color gamut of an original color gamut in a same color gamut space, wherein an area of the mapping target color gamut is smaller than an area of the original color gamut; the data collector is configured for acquiring the Lab value of the color point of the original color gamut, and determining the coordinate location of the color point in the hue plane of the original color gamut corresponding to the Lab values; the controller is further configured to determine whether the color point is located outside the mapping target gamut based on the coordinate location; and if the color point is located outside the mapping target gamut, determining a first intersection point of a connection line connecting the color point with a brightest midpoint and a borderline of the mapping target gamut and the connection line, and a second interaction point of the color point relative to a borderline of the mapping target gamut, wherein length of the second interaction point and the color point is the shortest distance between the color point and the borderline; based on a preset adjustment parameter, a coordinate location of the first intersection, and a coordinate location of the second intersection point, determining a mapping point where the color point is on a borderline of the mapping target color gamut.

The advantage of the disclosure: Different from the prior art, the color gamut mapping apparatus in this embodiment determines the mapping target color gamut of the original color gamut in the same color gamut space; it acquires the Lab value of the color point in the original color gamut; and determines the color point in the original color gamut relative to the coordinate location in a hue plane based on the Lab value; and determine the mapping target area of the color point based on the coordinate location. If a color point is located outside the mapping target area, it determines the first intersection point of the line connecting the color point and the maximum brightness and the borderline of the mapping target color gamut and the second intersection point of the color point relative to the borderline of the mapping target gamut. Finally, according to the preset adjustment parameter, the coordinate location of the first intersection point and the coordinate position of the second intersection point to determine the mapping point on the borderline of the mapping target color gamut where the color point maps. In the above way, the color areas which are originally mapped to the same point are distinguished, enhancing the level of detail of the color. In addition, through the adjustment of the adjustment parameters can also achieve the color difference; brightness and saturation between the optimization.

DETAILED DESCRIPTION OF PREFERRED EMBODIMENTS

Figure 1:
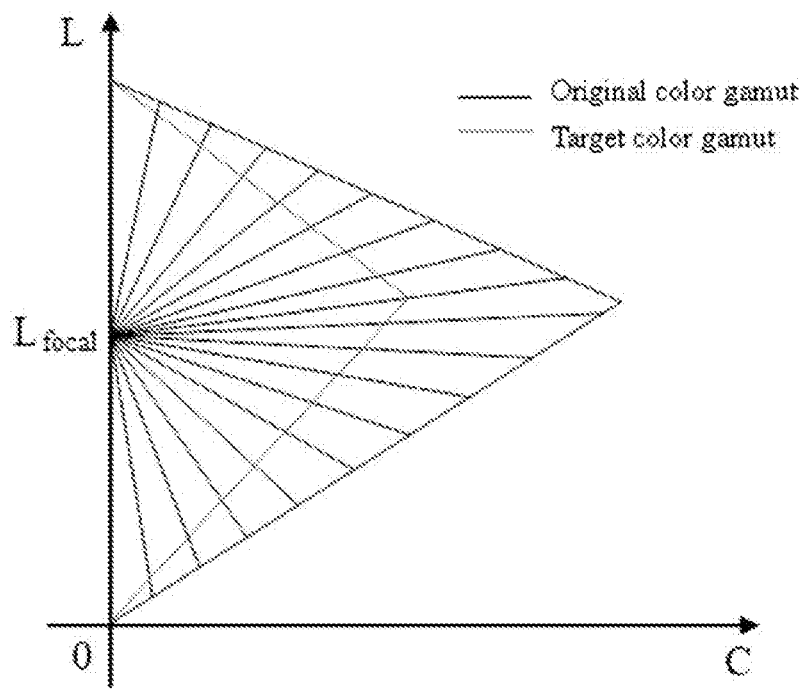
FIG. 1 is a schematic diagram of a color target gamut borderline outside a color gamut of HPMINDE algorithm of a prior art.
Figure 2:
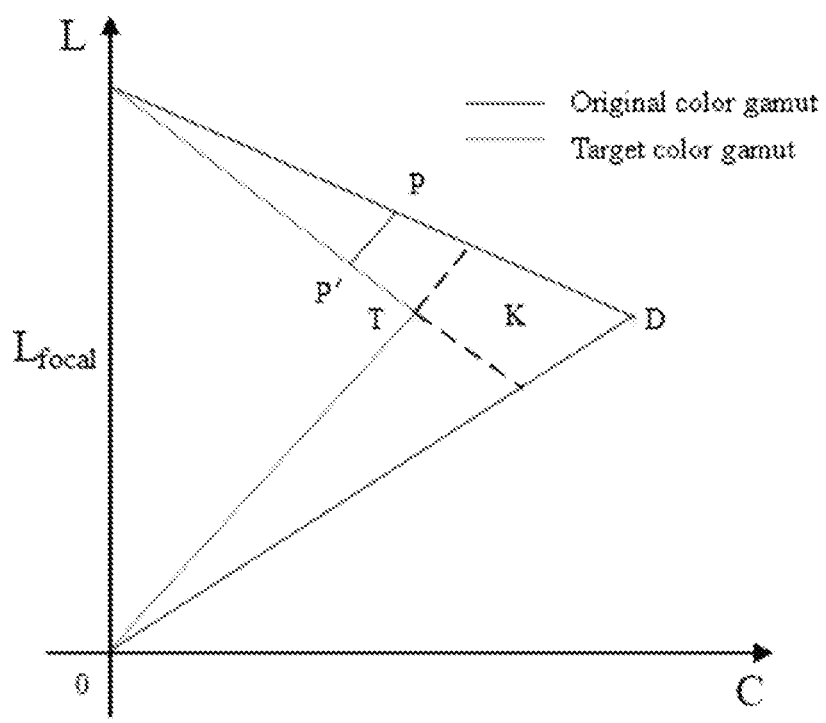
FIG. 2 is a schematic diagram of a borderline segment corresponding to a region outside the color gamut of HPMINDE algorithm of the prior art.
Figure 3:
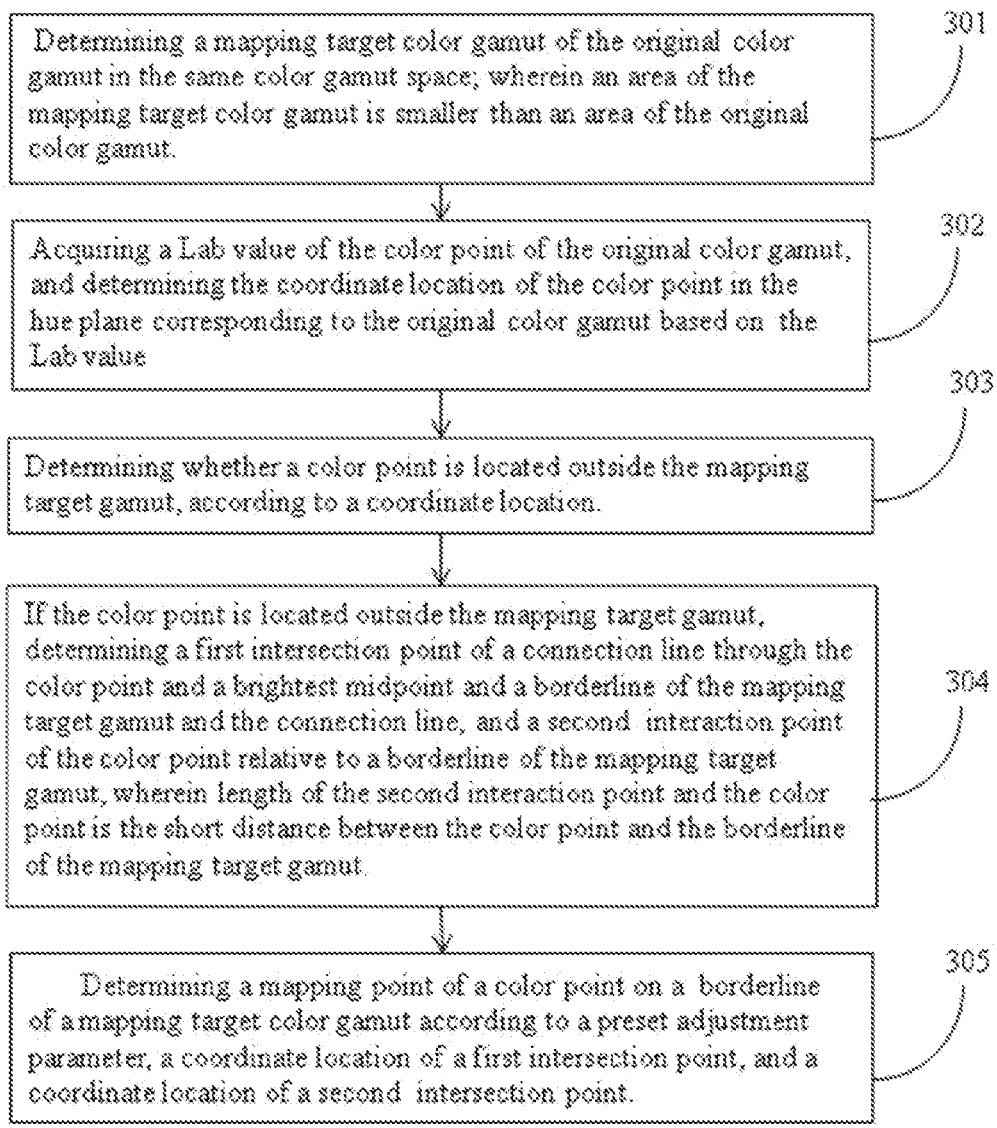
FIG. 3 is a schematic flow chart of an embodiment of a color gamut mapping method according to the present invention.

Referring to FIG. 3, FIG. 3 is a schematic flow chart of an embodiment of a color gamut mapping method according to the present invention. The color gamut mapping method in this embodiment includes the following steps:

301: determining a mapping target color gamut of the original color gamut in the same color gamut space; wherein an area of the mapping target color gamut is smaller than an area of the original color gamut.

In this embodiment, the original color gamut and the mapping target color gamut include a computer graphics color gamut space, a CIE color gamut space, and a television system color gamut space. For example, the original color gamut is s RGB color gamut, and the mapping target color gamut is Lab color gamut. The color gamut represents a range of areas formed by the number of colors. A range of colors can be represented by various screen display devices, printers, or printing devices. In other embodiments, and other color gamuts may also be mapped to each other. This is not limited herein.

Specifically, the original color gamut and the mapping target color gamut confirm the entire color space, and the gamut space is placed in the same coordinate system.

302: acquiring a Lab value of the color point of the original color gamut, and determining the coordinate location of the color point in the hue plane corresponding to the original color gamut based on Lab value.

In order to determine the position of the color point in the color gamut, the coordinates of the color point and the original color gamut and the mapping target color gamut need to be normalized. Specifically, after acquiring the RGB grayscale values of the color points in the original color gamut, the RGB grayscale values of the color points in the original color gamut are converted into the RGB optical values; and then the RGB optical values are converted into the tristimulus value through the conversion matrix; the tristimulus value transfers into Lab value, and you can get the Lab value of the color point of the original color gamut. A plane is defined through the Lab values of the color point of the original color gamut, the color point and the brightness axis in the original color gamut. The color coordinate, bright coordinate and hue angle in hue plane is obtained based on the color point in the original color gamut, brightness, and hue angle coordinates. The coordinates of the color point in the hue plane is determined according to the chromaticity coordinates, the brightness coordinates and the hue angle.

Figure 4:
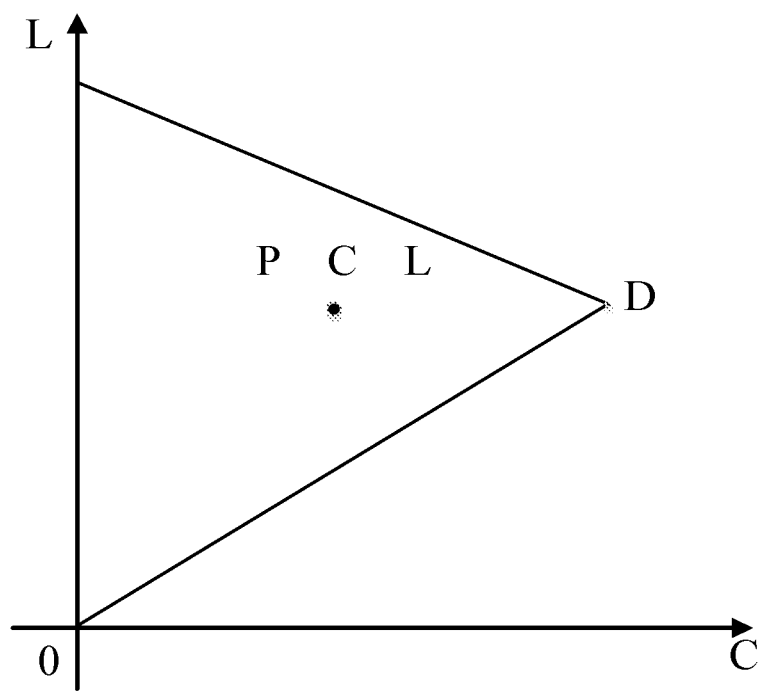
FIG. 4 is a schematic diagram of an embodiment of a color point's chromaticity value of the color gamut mapping method of FIG. 3.

For clarifying the above-described process, in a particular embodiment, shown in FIG. 4. FIG. 4 is a schematic diagram of an embodiment of the situation value of the color point of the color gamut mapping method. In FIG. 4, the horizontal axis is saturation, and the vertical axis represents the brightness. In this coordinate system, a Lab value of the color point of the original color gamut i.e., the brightness value L, a red-green color a and a blue-yellow color value b are used through any point P (C*, L*) and the brightness axis to define a plane. The three-dimensional space is transferred into two-dimensional plane of the original color gamut, through a and blue-yellow color value B, hue angle H* of the current point P, red-green color values and the situation corrdinate C* (specifically, the following formulas 1 to 3).

$$H^* = \arctan\frac{b}{a} \tag{1}$$

$$C^* = \sqrt{a^2 + b^2} \tag{2}$$

$$L^* = L \tag{3}$$

In order to acquire the Lab value of the color point in the original color gamut, after acquiring the RGB gray value of the color point in the original color gamut, the RGB gray value of the color point in the original color gamut is converted into the RGB optical value of the color in the original color gamut by the conversion equation point. And then the RGB optical value of the color point of the original color gamut is converted into the original color gamut within the tristimulus value. Finally, the tristimulus value of the original color gamut is converted into the Lab value of the color point of the original color gamut.

Preferably, the RGB grayscale values of the color point in the original color gamut is converted by Gamma 2.2 to the RGB optical value of the color point in the original color gamut The Gamma 2.2 is a special tone curve. When the Gamma value equal to 1, the curve is a straight line and the coordinate axis of 45°. At this time, the same input and output density are the same, and the value Gamma 2.2 higher than 1 makes the output lighter.

Preferably, the RGB optical values of the color point in the original color gamut are converted by the conversion matrix into tristimulus values of the color points in the original color gamut.

In general, the RGB gradation values cannot be directly converted into Lab values. They need to be converted into XYZ tristimulus values and then converted to Lab value (i.e.: RGB gradation values –XYZ tristimulus values-Lab value). In an alternative embodiment, the RGB gray value is first converted to XYZ tristimulus values.

Specifically, it is assumed that r, g and b are three channels of pixels, and the value range is [0,255]. The conversion formula is as follows:

$$\begin{cases} R = \text{gamma}\left(\frac{r}{255.0}\right) \\ G = \text{gamma}\left(\frac{r}{255.0}\right) \\ B = \text{gamma}\left(\frac{r}{255.0}\right) \end{cases} \quad (4)$$

$$\text{gamma}(x) = \begin{cases} \left(\frac{x+0.055}{1.055}\right)^{2.4} & (X > 0.04045) \\ \frac{X}{12.92} & \text{others} \end{cases} \quad (5)$$

$$\begin{bmatrix} X \\ Y \\ Z \end{bmatrix} = M \times \begin{bmatrix} R \\ G \\ B \end{bmatrix} \quad (6)$$

The conversion matrix is as follows:

$$M = \begin{bmatrix} 0.4124 & 0.3579 & 0.1805 \\ 0.2126 & 0.7152 & 0.0722 \\ 0.0193 & 0.1192 & 0.9505 \end{bmatrix}$$

Equivalent to the following formula:

$X = \text{Var}\_R \times 0.4124 + \text{Var}\_G \times 0.3576 + \text{Var}\_B \times 0.1805$ $X = \text{Var}\_R \times 0.2126 + \text{Var}\_G \times 0.7451 + \text{Var}\_B \times 0.0722$ $X = \text{Var}\_R \times 0.0193 + \text{Var}\_G \times 0.1192 + \text{Var}\_B \times 0.9505$ After acquiring the X red primary color stimulation amount, the Y green primary color stimulation amount, and the Z blue primary color stimulation amount, it is converted into a transfer Lab.

$$L^* = 116 f\left(\frac{Y}{Y_n}\right) - 16 \quad (7)$$

$$a^* = 500\left[f\left(\frac{X}{X_n}\right) - f\left(\frac{Y}{Y_n}\right)\right]$$

$$b^* = 200\left[f\left(\frac{Y}{Y_n}\right) - f\left(\frac{Z}{Z_n}\right)\right]$$

$$f(t) = \begin{cases} t^{\frac{1}{3}} & t > \left(\frac{6}{29}\right)^3 \\ \frac{1}{3}\left(\frac{29}{6}\right)^2 t + \frac{4}{29} & 其它 \end{cases} \quad (8)$$

Where X is the red primary color stimulating amount, Y is green primary stimulating amount, and Z is blue primary stimulating amount. Xn, Yn, Zn default values are 95.047, 100.0, 108.883. f(t) is a correction function, t is corrected parameters, L* is the brightness value, a* is the red and green color value, and b* is the blue and yellow color value.

303: Determining whether a color point is located outside the mapping target area, according to a coordinate location.

In an optional embodiment, the coordinate location is compared with the borderline function of the mapping target color gamut, to determine whether the color point is located outside the mapping target area.

Specifically, after acquiring a Lab value of one color point in the original color gamut to acquire a brightness value L, a red-green color value a and a blue-yellow color value b. A hue angle H of the two-dimensional plane and a brightness coordinate L of the two-dimensional plane and the chromaticity coordinate are obtained according to the equation (1-3). The hue angle and chromaticity values are obtained into the target color gamut borderline function to determine the color point position relationship.

304: if the color point is located outside the mapping target gamut, determining a first intersection point of a connection line connecting the color point with a brightest midpoint and a borderline of the mapping target gamut and the connection line, and a second interaction point of the color point relative to a borderline of the mapping target gamut, wherein a length between the second interaction point and the color point is the shortest distance between the color point and the borderline of the mapping target gamut.

In order to distinguish the levels of the color regions mapped to the same point and enhance the detail level of the colors, the intersection point connecting between the point of maximum brightness and the color point is selected as the first intersection point. The second intersection point is a point in the target color gamut where the distance between the point of the target color gamut and the color point is the shortest distance, so that the target color point is located in the interval between the first intersection point and the second intersection point.

305: Determining a mapping point of a color point on a borderline of a mapping target color gamut according to a preset adjustment parameter, a coordinate location of a first intersection point, and a coordinate location of a second intersection point.

Specifically, the brightness coordinate and the chromaticity coordinate of the first intersection point and the second intersection point are respectively acquired through the borderline of the target gamut; the chromaticity coordinates of the mapping point is obtained by adding an adjusting parameter and a chromaticity coordinate difference between the first intersection point and the second intersection point adding with a chromaticity coordinate of the second intersection point Similarly; the brightness coordinates of the first intersection point and the second intersection point are added to the brightness coordinates of the second intersection point to acquire the brightness coordinates of the mapping point. The first intersection and the second intersection point are determined. Afterwards, the mapping point of the target color gamut is determined according to the adjustment parameters.

Figure 5:
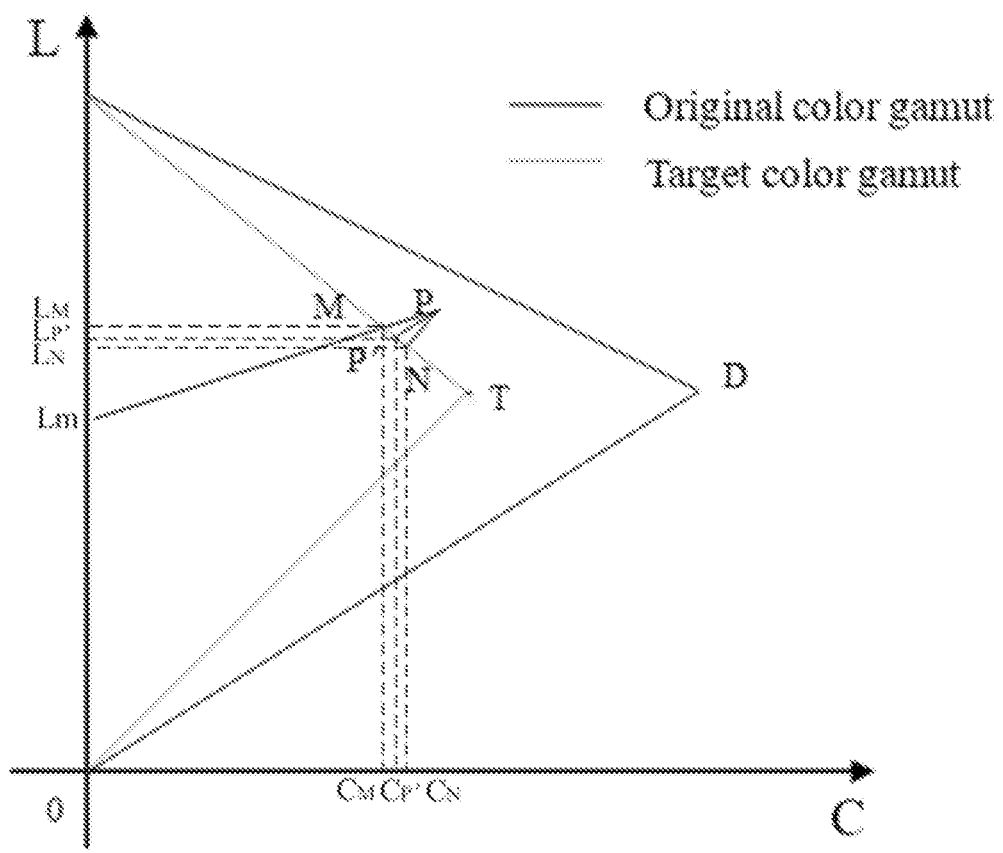
FIG. 5 is a schematic diagram of an embodiment of acquiring a mapping point coordinate in the gamut mapping method of FIG. 3.

In a specific embodiment, as shown in FIG. 5, FIG. 5 is a diagram of an embodiment of the obtained mapping point coordinates of the color gamut mapping method of FIG. 3. In the diagram, P is the color point in the original color gamut, and the point P is located outside the target color gamut. The point P and the midpoint $L_m$ of maximum brightness coordinate axis connected to each other and intersected with the target color gamut borderline at the point M. The vertical line of the target gamut borderline intersects with over the target gamut borderline at the point N, where the point M is the first intersection point, and N is the second intersection point. The brightness coordinate $L_M$ and the chromaticity coordinate $C_M$ of the first intersection point and the brightness coordinate point $L_N$ and chromaticity coordinates $C_N$ of the second intersection point can be quickly determined according to the boundary function or coordinates. Then, the mapping point chromaticity coordinate $C_{P'}$ is obtained by adding the chromaticity coordinates $C_N$ of the second intersection point according to the adjustment parameter $\alpha$ and the chromaticity coordinate difference $(C_M-C_N)$ between the first intersection point and the second intersection point. In the same way, brightness adjustment parameter coordinate difference $(L_M-L_N)$ between the first intersection point and the second intersection point adds with the brightness coordinates $L_N$ of the second intersection point obtained brightness coordinate mapping point $L_{P'}$. The specific details of the calculation represented by the following equation (9-10).

$$C_P=\alpha(C_M-C_N)+C_N \quad (9)$$

$$L_P=\alpha(L_M-L_N)+L_N \quad (10)$$

Among them, the setting value of the adjustment parameter is between 0 and 1, and the information for acquiring the adjustment parameter is mainly obtained from the visual evaluation experiment result. Specifically, a plurality of groups of samples in the original color gamut are sampled and compared, and a color image containing all the color gamut spaces as much as possible is used. Samples of the same color point are sampled and analyzed under a plurality of parameters. A sampling point is selected on a mapping borderline between two intersection points on a color gamut borderline, and the two intersection points are the first intersection point and the second intersection point determined in the foregoing embodiment. These chromaticity sampling points are designated as P1, P2, P3~PN. The compression map on the brightness line are performed by selecting the same mapping algorithm to P1, P2, P3~PN respectively. The chromaticity value of each point on the brightness line is analyzed, to acquire the point of the chromaticity mapping results. In the above way, the brightness of each point and the color difference mapping result are obtained. The best display mapping point is selected by the comprehensive analysis, and then to acquire the color point adjustment parameters. The statistical comparison with the calculation model of each color point adjustment parameters of the original color gamut will be able to get the best adjustment parameters of information.

Figure 6:
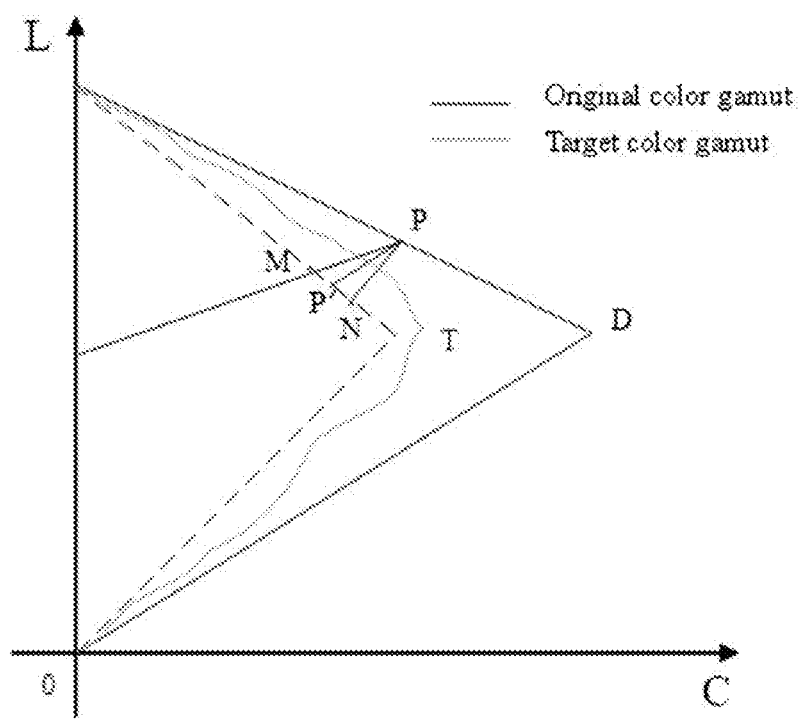
FIG. 6 is a schematic diagram of an embodiment of acquiring a new borderline of the gamut mapping method of FIG. 3.

In general, during the gamut mapping, the target gamut boundary is not a smooth curve or straight line, and the color of the target gamut boundary is difficult to display through the device. Therefore, the color point can be mapped on a new borderline of 80%~90% of the color gamut boundary. The new borderline is obtained according to the actual borderline. Specifically, as shown in FIG. 6, FIG. 6 is a schematic diagram of an embodiment of a gamut mapping method of FIG. 3 to acquire a new borderline diagram. The target color gamut borderline is not acquired by the arithmetic boundary function. It directly causes the serious color distortion in the mapped target color gamut borderline. In order to be able to carry on the color mapping directly, can set up the new borderline is made in the boundary of 80%-90% in the target color gamut directly; And the first intersection point and the second intersection point through the new boundary line are confirmed. The first intersection point is the intersection point of the line connecting the maximum brightness midpoint with the color point and the new boundary line. The second intersection point is the intersection point of the line which is the shortest distance point of the borderline to the color point and the new boundary line. Finally, according to the preset adjustment parameter, the coordinate position of the first intersection point and the coordinate position of the second intersection point, the mapping point of the color point on the borderline of the mapping target color gamut is determined. For a specific implementation process, reference may be made to related literal descriptions of the embodiments in FIG. 3 to FIG. 5, and details are not described herein again.

After the mapping process is completed, the Lab value of the mapping point is converted into a tristimulus value through an empirical formula. The specific formula is as follows (10) to (11). Then, the tristimulus value is converted to the RGB optical value through the conversion matrix, and finally, the Gamma2.2 converted to RGB grayscale to output.

$$\begin{cases} f\left(\dfrac{Y}{Yn}\right) = \dfrac{L+16}{116} \\ f\left(\dfrac{X}{Xn}\right) = \dfrac{a}{500} + f\left(\dfrac{Y}{Yn}\right) \\ f\left(\dfrac{Z}{Zn}\right) = f\left(\dfrac{Y}{Yn}\right) - \dfrac{b}{200} \end{cases} \quad (10)$$

$$t = \begin{cases} f(t)^3 & f(t) > \dfrac{6}{29} \\ \dfrac{\left(f(t) - \dfrac{4}{29}\right)}{\left(\dfrac{29}{6}\right)^2 \times \dfrac{1}{3}} & \text{others} \end{cases} \quad (11)$$

Xn, Yn, Zn default values is 95.047, 100.0, 108.883, L is a luminance value, a is red-and-green color value, b is blue-and-yellow color values, t is a correction parameter, f(t) is a correction function.

Distinguished from the prior art, a target mapping color gamut of the original color gamut is determined in the same color space; Lab values of the color point of the original color gamut are obtained, and then the coordinate position in the hue coordinate corresponding to Lab value is determined according to the color point of the original color gamut. The color point is determined whether it is located outside the mapping target area according to a coordinate location; and if a color point is located outside the mapping target area, determining the first intersection point of the line connecting the color point and the maximum brightness midpoint intersecting with the mapping target gamut borderline. The second intersection point is the color point corresponds to the mapping target gamut borderline. Finally, according to the preset adjustment parameter, the coordinate location of the first intersection point and the coordinate location of the second intersection point, the color point is determined as the mapping point on the borderline of the mapping target color gamut. In the above way, the color areas which are originally mapped to the same point are distinguished, for enhancing the level of detail of the color. In addition, through the adjustment of the adjustment parameters, the color difference, brightness and saturation between the optimization can also be achieved.

Figure 7:
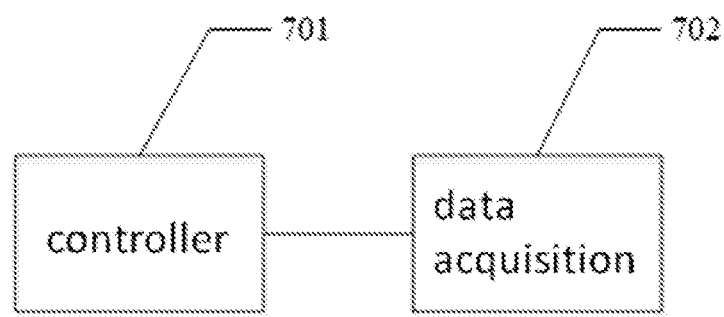
FIG. 7 is a schematic structural diagram of an embodiment of a color gamut mapping device according to the present invention.

The present invention also provides a gamut mapping apparatus, referring to FIG. 7. FIG. 7 is a schematic structural diagram of the embodiment of a color gamut mapping apparatus according to the present invention, includes a controller 701 electrically connected to each other and a data acquisition 702. A controller 701 is used for determining a mapping target gamut of an origin color gamut in the same color gamut space. An area of the mapping target color gamut is smaller than an area of the original color gamut.

A data acquisition 702 for acquiring a Lab value of the color gamut of the original color gamut. The color point is determined in the or within hue plane coordinate location corresponding to the original color gamut according to Lab value;

The controller 701 is further configured to determine whether the color point is located outside the mapping target area according to the coordinate location; if the color point is outside the mapping target area, determine a first intersection point of the color point and the maximum brightness midpoint line with the mapping target color gamut borderline. The length of the connection line between the second intersection point and the color point is the shortest distance between the color point and the target color gamut borderline. According to the preset adjustment parameter, the coordinate location of the first intersection point and the coordinate location of the second intersection point, the mapping point on the borderline where the color point in the mapping target color gamut is determined.

For a specific implementation process, reference may be made to FIG. 3 to FIG. 6 and related literal descriptions of any implementation manners and details are not described herein again.

Different from the prior art, the color gamut mapping apparatus in this embodiment determines the mapping target color gamut of the original color gamut in the same color gamut space; it acquires the Lab value of the color point in the original color gamut; and determines the color point in the original color gamut relative to the coordinate location in a hue plane based on the Lab value, and determine the mapping target area of the color point based on the coordinate location. If a color point is located outside the mapping target area, it determines the first intersection point of the line connecting the color point and the maximum brightness and the borderline of the mapping target color gamut and the second intersection point of the color point relative to the borderline of the mapping target gamut. Finally, according to the preset adjustment parameter, the coordinate location of the first intersection point and the coordinate location of the second intersection point to determine the mapping point on the borderline of the mapping target color gamut where the color point maps. In the above way, the color areas which are originally mapped to the same point are distinguished, enhancing the level of detail of the color. In addition, through the adjustment of the adjustment parameters can also achieve the color difference, brightness and saturation between the optimization.

The foregoing contents are detailed description of the disclosure in conjunction with specific preferred embodiments and concrete embodiments of the disclosure are not limited to these description. For the person skilled in the art of the disclosure, without departing from the concept of the disclosure, simple deductions or substitutions can be made and should be included in the protection scope of the application.

What is claimed is:

1. A color gamut mapping method, comprising:
processing a color image into a target image by following steps:
determining a mapping target color gamut of an original color gamut in a same color gamut space; wherein an area of the mapping target color gamut is smaller than an area of the original color gamut;
acquiring a RGB grayscale value of a color point in the original color gamut, and acquiring a Lab value of the color point in the original color gamut according to the RGB grayscale value;
using the Lab value of the color point in the original color gamut over the color point and a brightness axis in the original color gamut as a plane to acquire a chromaticity coordinate, a brightness coordinate and a hue angle of the color point in a hue plane corresponding to the original color gamut;
determining a coordinate location where the color point in the hue plane corresponding to the original color gamut based on the chromaticity coordinate, the brightness coordinate and the hue angle in the hue plane;
determining whether the color point is located outside the mapping target gamut according to the coordinate location;
if the color point is located outside the mapping target gamut, determining a first intersection point of a connection line connecting the color point with a brightest midpoint and a borderline of the mapping target gamut, and a second interaction point of the color point relative to the borderline of the mapping target gamut, wherein a length between the second interaction point and the color point is the shortest distance between the color point and the borderline of the mapping target gamut;
respectively acquiring the coordinate location of the first intersection point and the second intersection point; wherein the coordinate location comprises a brightness coordinate and a chromaticity coordinate;
acquiring the chromaticity coordinate of a mapping point by an adjusting parameter and a chromaticity coordinate difference between the first intersection point and the second intersection point with a chromaticity coordinate of the second intersection point; and
acquiring the brightness coordinate of the mapping point by the adjusting parameter and a brightness coordinate difference between the first intersection point and the second intersection point with a brightness coordinate; and
outputting the target image to a target device for display.

2. The color gamut mapping method according to claim 1, wherein a setting value of the adjustment parameter is between 0 and 1.

3. The color gamut mapping method according to claim 1, wherein the step of acquiring a RGB grayscale value of a color point in the original color gamut, and acquiring a Lab value of the color point in the original color gamut according to the RGB grayscale value specifically comprises:
  acquiring the RGB grayscale values of the color point in the original color gamut, and converting the RGB grayscale values of the color point in the original color gamut into RGB optical values;
  converting the RGB optical values into tristimulus values;
  converting the tristimulus values into the Lab value to acquire the Lab value of the color point in the original color gamut.

4. The color gamut mapping method according to claim 3, wherein the RGB optical values of the color points in the original color gamut are converted into the tristimulus values of the color points in the original color gamut by a conversion matrix.

5. The color gamut mapping method according to claim 1, wherein the step of the determining whether the color point is located outside the mapping target area according to the coordinate location specifically comprises:
  comparing the coordinate location with a borderline function of the mapping target color gamut, and determining whether the color point is located outside the mapping target gamut.

6. The color gamut mapping method according to claim 1, wherein after the step of determining whether the color point is located outside the mapping target area according to the coordinate location, further comprises:
  if the color point is located inside the mapping target gamut, the Lab value of the color point is directly converted into the RGB grayscale value to output.

7. The color gamut mapping method according to claim 3, wherein the RGB grayscale value and the RGB optical value are converted by a gamma function.

8. A color gamut mapping method, comprising:
  processing a color image into a target image by following steps:
    determining a mapping target color gamut of an original color gamut in a same color gamut space; wherein an area of the mapping target color gamut is smaller than an area of the original color gamut;
    acquiring a Lab value of a color point of the original color gamut, and determining a coordinate location of the color point located in a hue plane relative to the original color gamut based on the Lab value;
    determining whether the color point is located outside the mapping target area according to the coordinate location;
    if the color point is located outside the mapping target gamut, determining a first intersection point of a connection line connecting the color point with a brightest midpoint and a borderline of the mapping target gamut, and a second interaction point of the color point relative to a borderline of the mapping target gamut, wherein a length between the second interaction point and the color point is the shortest distance between the color point and the borderline of the mapping target gamut; and
    based on a preset adjustment parameter, a coordinate location of the first intersection point, and a coordinate location of the second intersection point, determining a mapping point where the color point is on a borderline of the mapping target gamut; and
  outputting the target image to a target device for display;
  wherein the step of acquiring a Lab value of a color point of the original color gamut, and determining a coordinate location of the color point located in a hue plane relative to the original color gamut based on the Lab value comprises:
    acquiring an RGB grayscale value of the color point within the original color gamut, and acquiring the Lab value of the color point within the original color gamut based on the RGB grayscale value;
    using the Lab value of the color point in the original color gamut over the color point and a brightness axis in the original color gamut as a plane to acquire a chromaticity coordinate, a brightness coordinate, and a hue angle of the color point in a hue plane corresponding to the original color gamut; and
    determining the coordinate location where the color point in the hue plane corresponding to the original color gamut, based on the chromaticity coordinate, the brightness coordinate and the hue angle.

9. The color gamut mapping method according to claim 8, wherein the step of based on a preset adjustment parameter, a coordinate location of the first intersection point, and a coordinate location of the second intersection point, determining the mapping point where the color point is on a borderline of the mapping target color gamut specifically comprises:
  respectively acquiring the coordinate location of the first intersection point and the second intersection point, wherein the coordinate location comprises a brightness coordinate and a chromaticity coordinate;
  acquiring the chromaticity coordinates of the mapping point by the adjusting parameter and a chromaticity coordinate difference between the first intersection point and the second intersection point with a chromaticity coordinate of the second intersection point;
  acquiring the brightness coordinate of the mapping point by the adjusting parameter and a brightness coordinate difference between the first intersection point and the second intersection point with a brightness coordinate.

10. The color gamut mapping method according to claim 8, wherein setting value of the adjustment parameter is between 0 and 1.

11. The color gamut mapping method according to claim 8, wherein the step of acquiring an RGB grayscale value of a color point within the original color gamut, and a Lab value of a color point within an original color gamut based on the RGB grayscale value comprises steps as follow:
  acquiring the RGB grayscale values of the color point in the original color gamut, and converting the RGB grayscale values of the color point in the original color gamut into RGB optical values;
  converting the RGB optical values into tristimulus values;
  converting the tristimulus values into the Lab value, and acquiring the Lab value for the color point in the original color gamut.

12. The color gamut mapping method according to claim 11, wherein the RGB optical values of the color points within the original color gamut are converted into the tristimulus values of the color points in the original color gamut by a conversion matrix.

13. The color gamut mapping method according to claim 8, wherein the step of determining whether the color point is located outside the mapping target area according to the coordinate location specifically comprises:

comparing the coordinate location with a borderline function of the mapping target color gamut, and determining whether the color point is located outside the mapping target gamut.

14. The color gamut mapping method according to claim 8, wherein after determining whether the color point is located outside the mapping target gamut according to the coordinate location the method further comprises:
  if the color point is located in the mapping target gamut the Lab value of the color point is directly converted into a RGB grayscale value to output.

15. The color gamut mapping method according to claim 11, wherein the RGB grayscale values and the RGB optical values are converted by a gamma function.

* * * * *